US011637961B2

(12) United States Patent
Dabral et al.

(10) Patent No.: US 11,637,961 B2
(45) Date of Patent: Apr. 25, 2023

(54) IMAGE DATA PROCESSING FOR MULTI-EXPOSURE WIDE DYNAMIC RANGE IMAGE DATA

(71) Applicant: Texas Instruments Incorporated, Dallas, TX (US)

(72) Inventors: Shashank Dabral, Allen, TX (US); Rajasekhar Reddy Allu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/825,635

(22) Filed: May 26, 2022

(65) Prior Publication Data

US 2022/0294960 A1 Sep. 15, 2022

Related U.S. Application Data

(60) Continuation of application No. 17/001,398, filed on Aug. 24, 2020, now Pat. No. 11,375,131, which is a continuation of application No. 16/208,313, filed on Dec. 3, 2018, now Pat. No. 10,757,339, which is a division of application No. 15/157,568, filed on May 18, 2016, now Pat. No. 10,148,888.

(51) Int. Cl.
*H04N 5/235* (2006.01)
*H04N 5/217* (2011.01)
(Continued)

(52) U.S. Cl.
CPC ........... *H04N 5/2352* (2013.01); *H04N 5/217* (2013.01); *H04N 5/2353* (2013.01);
(Continued)

(58) Field of Classification Search
CPC .. H04N 5/2352; H04N 5/2353; H04N 5/2355; H04N 5/217; H04N 5/265; H04N 9/735; H04N 5/35581
See application file for complete search history.

(56) References Cited

U.S. PATENT DOCUMENTS 7,474,345 B2  1/2009  Luo et al.
8,264,568 B2  9/2012  Tejada et al.
(Continued)

FOREIGN PATENT DOCUMENTS

WO  20120272190 A1  6/2014

OTHER PUBLICATIONS

Azami et al., IMX224LQR, IMX225LQR, Diagonal 6.09 mm (Type 1/3) Approx. 1 27M-Effective Pixel Color CMOS mage Sensor, Sony New Product Information, retrieved from the Internet Oct. 7, 2015, http://www.sony.net/Products/SC-HP/new_pro/october_2014/imx224_225_e.html, 7 pgs.

*Primary Examiner* — Mekonnen D Dagnew
(74) *Attorney, Agent, or Firm* — Carl G. Peterson; Frank D. Cimino (57) ABSTRACT

Disclosed examples include integrated circuits, merge circuits and methods of processing multiple-exposure image data, in which a single pre-processing circuit is used for pre-processing first input exposure data associated with a first exposure of the image, and then for pre-processing second input exposure data associated with a second exposure of the image, and the first and second pre-processed exposure data are merged to generate merged image data for tone mapping and other post-processing. An example merge circuit includes a configurable gain circuit to apply a gain to the first and/or second exposure data, as well as a configurable weighting circuit with a weight calculation circuit and a motion adaptive filter circuit to compute a first and second weight values for merging the pre-processed first and second exposure data.

17 Claims, 7 Drawing Sheets

(51) Int. Cl.
*H04N 5/265* (2006.01)
*H04N 9/73* (2023.01)
*H04N 5/355* (2011.01)

(52) U.S. Cl.
CPC ........... *H04N 5/2355* (2013.01); *H04N 5/265* (2013.01); *H04N 9/735* (2013.01); *H04N 5/35581* (2013.01)

(56) References Cited

U.S. PATENT DOCUMENTS

| | | |
|---|---|---|
| 9,148,580 B2 | 9/2015 | Zhang et al. |
| 2007/0002164 A1* | 1/2007 | Ward .................. H04N 5/2355 348/E5.034 |
| 2008/0309810 A1 | 12/2008 | Smith et al. |
| 2009/0002530 A1 | 1/2009 | Arai et al. |
| 2009/0216961 A1* | 8/2009 | Kwon ................. G06F 13/1652 711/149 |
| 2010/0245620 A1 | 9/2010 | Arai et al. |
| 2010/0277623 A1 | 11/2010 | Tejada et al. |
| 2012/0026367 A1 | 2/2012 | Noraz et al. |
| 2012/0249830 A1 | 10/2012 | Tsubaki |
| 2012/0262597 A1 | 10/2012 | Frantz |
| 2012/0262600 A1* | 10/2012 | Velarde .................. H04N 5/353 348/223.1 |
| 2014/0152694 A1 | 6/2014 | Narasimha et al. |
| 2015/0022693 A1 | 1/2015 | Appia et al. |
| 2015/0097978 A1* | 4/2015 | Lee .................... H04N 5/23277 348/208.6 |
| 2015/0207974 A1 | 7/2015 | Mody et al. |
| 2016/0119575 A1 | 4/2016 | Dabral |
| 2016/0267333 A1 | 9/2016 | Jung et al. |

* cited by examiner

FIG. 9

IMAGE DATA PROCESSING FOR MULTI-EXPOSURE WIDE DYNAMIC RANGE IMAGE DATA

This application is a Continuation of and claims priority to U.S. patent application Ser. No. 17/001,398 filed Aug. 24, 2020, which is a Continuation of patent application Ser. No. 16/208,313, filed Dec. 3, 2018 (now U.S. Pat. No. 10,757, 339), which is a Division of patent application Ser. No. 15/157,568, filed May 18, 2016 (now U.S. Pat. No. 10,148, 888), the contents of all three are herein incorporated by reference in their entirety.

TECHNICAL FIELD

The present disclosure relates generally to image processing and more particularly to circuits for processing image data from wide dynamic range (WDR) sensors.

BACKGROUND

Cameras and image sensors are in widespread use for surveillance, motion control and other applications. Automotive applications, for example, include rear view cameras for assisting a driver while backing up, and vehicle-mounted cameras may provide inputs to control systems for avoiding obstacles, controlling braking, steering, acceleration, etc. Digital camera sensors have limited dynamic range which is typically much less than the dynamic range of natural environments and other observed areas as well as the dynamic range of the human eye. For example, an indoor room may be unlit, but have a window with a view of a rising or setting sun. This presents extreme dark areas as well as extremely bright areas to a viewing camera. While the human visual system is able to capture such a dynamic range, most digital cameras are unable to do so due to limited dynamic range in the sensor and the image processing hardware. As such, digital images of scenes with high dynamic range usually tend to have highlights which are blown out and shadow regions which are completely dark. The low dynamic range in processed images is problematic in automotive and surveillance camera systems, where retaining the entire dynamic range is important. Wide Dynamic Range (WDR) sensors present a potential solution, and are becoming popular for automotive and surveillance applications to preserve the full dynamic range of a natural scene. However existing image processing (image pipe) circuits and architectures do not fit well with WDR sensor signal processing, and a complete wide dynamic range image processing pipe is costly and complex to implement. For example, the exposure data for multiple exposures must be preprocessed prior to merge processing, and thus multi-exposure data from WDR sensors requires larger and more complicated processing circuitry. WDR sensors may also suffer from motion artifacts which are difficult to correct in post-processing. Furthermore, merging multiple temporally separated frames can lead to degradation in image quality due to pixel noise and motion artifacts. In addition, the presence of LED lights or other pulsed light sources in a captured scene can lead to discrepancies between multiple exposures of an image obtained using WDR sensors. In particular, pulsed light sources can be in an "off" state during a first exposure time, and then be turned "on" during a second exposure time. In such cases, WDR sensors provide first and second exposure data for the same image, in which one or more pixel locations will have discrepancies between the first and second exposure data. Accordingly, WDR sensors present new challenges for image processing in order to provide a complete solution for wide dynamic range imaging.

SUMMARY

Disclosed examples include image signal processing circuitry, integrated circuits, merge circuits and methods to process multiple-exposure image data, such as first and second exposure data from a wide dynamic range sensor. A single pre-processing circuit is used to perform pre-processing on first input exposure data associated with a first exposure of the image, and then for pre-processing second input exposure data associated with a second exposure of the image. The pre-processed data is then merged for the two exposures prior to tone mapping and other post-processing. Merge circuitry and methods are disclosed, including configurable gain circuits apply gain factors to the date of one or both of the first and second image data prior to merging. The merge circuit in certain examples further includes a configurable weight calculation circuit to compute weight values for the first and second exposure data for the merge processing. The merge circuit in some examples also includes a motion adaptive filter circuit to compute a motion adaptive weighting value to scale the gain factors applied to the first and second image data.

DETAILED DESCRIPTION

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Disclosed examples provide efficient circuits, ICs and methods for pre-processing and merging multiple-exposure image data from WDR and other image data sources. In certain disclosed examples, first and second exposure data is obtained for a given image, such as using an image sensor at a first (e.g., long) exposure time setting to obtain first exposure data, and then using the sensor at a second, shorter exposure time setting to obtain the second exposure data. Each set of data includes individual pixel data for a given pixel location of the obtained image, with the longer exposure time data facilitating capture of dark areas of an image scene, and the shorter exposure time data to capture details of brightly lighted portions of the image scene. The disclosed circuits and methods facilitate pre-processing as well as merge processing for such dual exposure image data. In addition, the disclosed concepts are applicable in a variety of different imaging applications, including without limitation processing of image data for vehicle-mounted cameras, surveillance cameras, robotics another motion control applications, etc.

Figure 1:
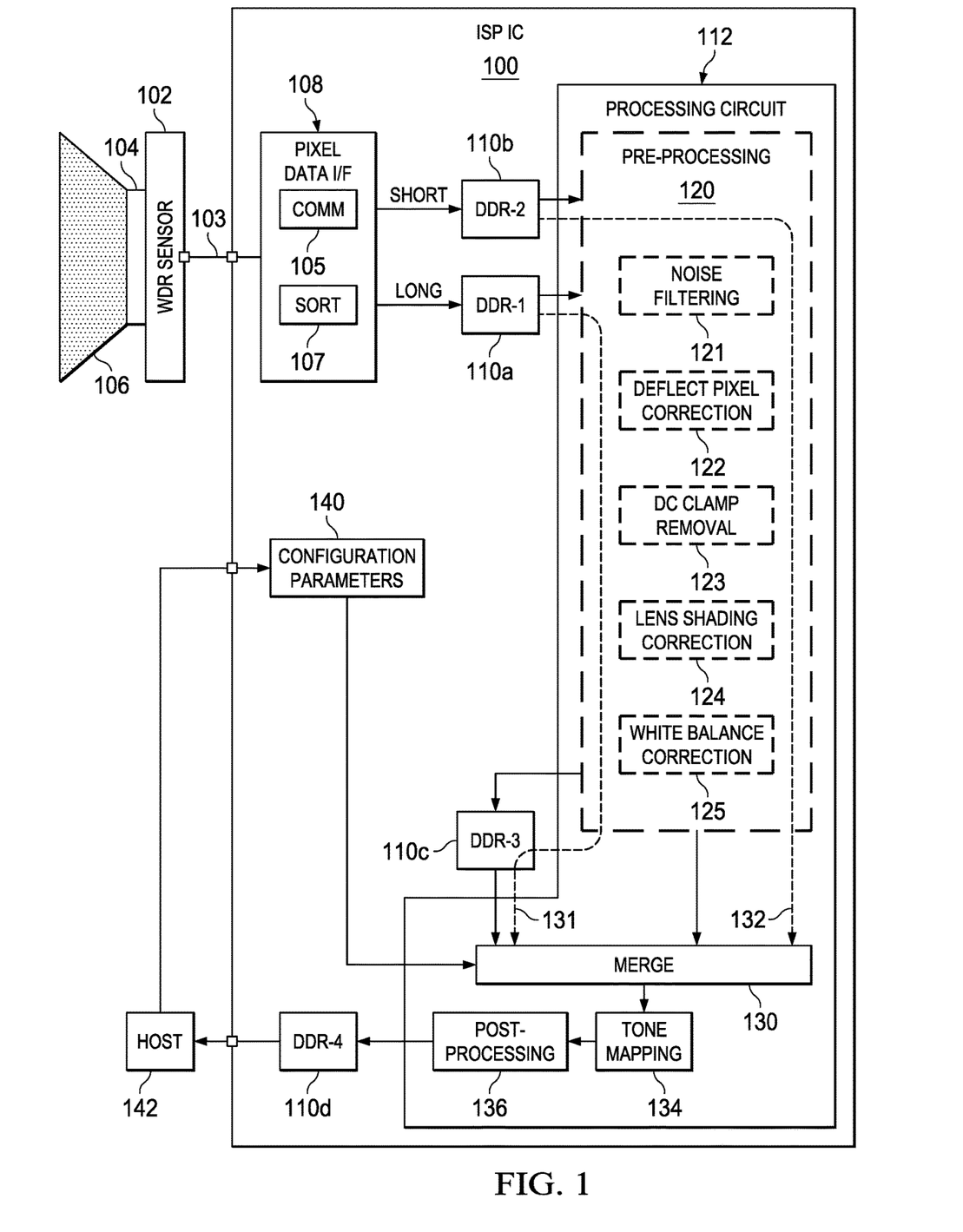
FIG. 1 is a system diagram of an image sensor processor (ISP) integrated circuit (IC).
Figure 2:
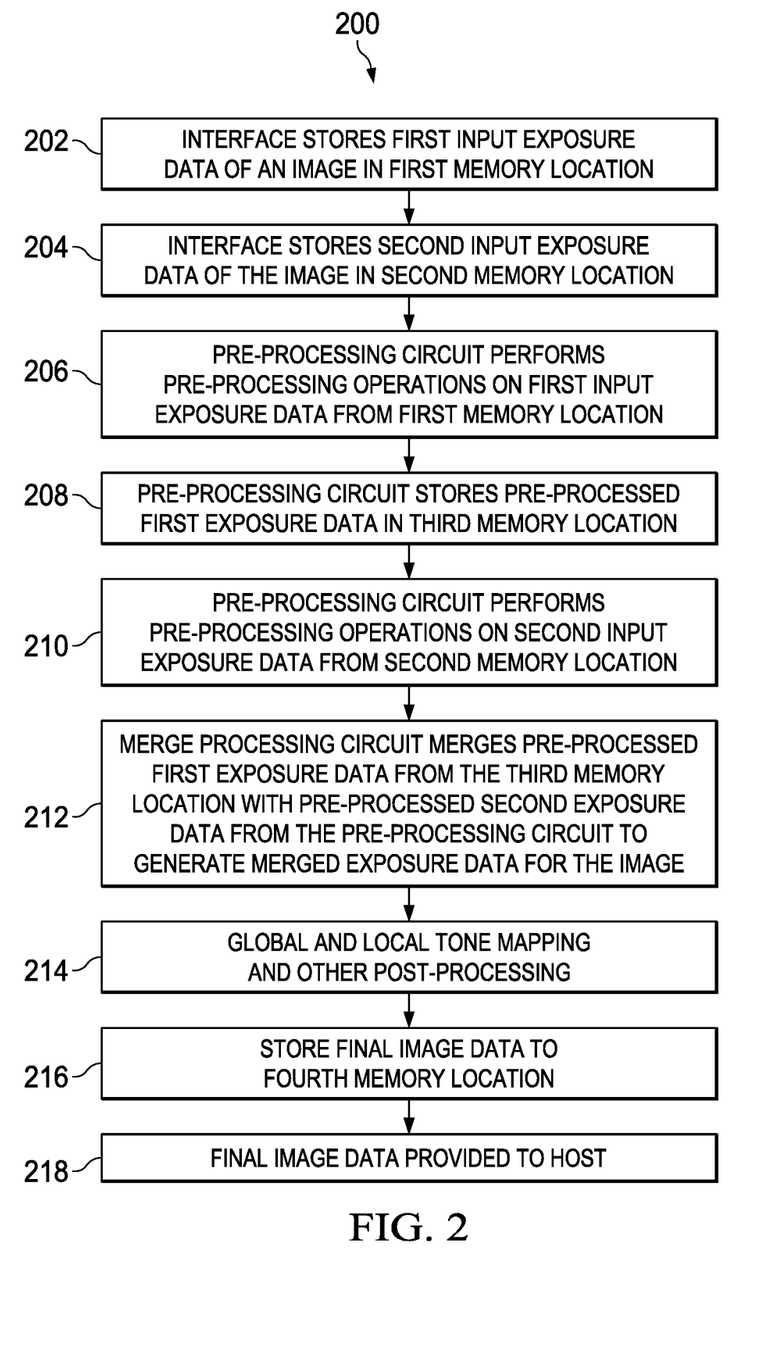
FIG. 2 is a flow diagram of an image processing method.

Referring initially to FIGS. 1-4, FIG. 1 shows an imaging system including an image sensor processor IC 100 receiving signal data from a WDR sensor 102 via a data connection or link 103, which can be wired or wireless. FIG. 2 shows a process or method 204 processing input exposure data, which can be implemented in the IC 100. In one example, the IC 100 is mounted to a printed circuit board (PCB, not shown), and includes one or more pins or terminals electrically connected to a board-mounted connector via conductive PCB traces, and the WDR sensor 102 is coupled with the connector via a cable (not shown). The integrated circuit 100 includes a variety of blocks or circuits described hereinafter, which can be dedicated logic circuits, programmable logic circuits, and/or functions implemented by digital processor circuitry. In one example, the sensor 102 is a Digital overlap (DOL) WDR sensor that that senses and detects light within a corresponding sensor field 106 through a lens structure 104 to capture image exposure data.

The IC 100 includes a pixel data interface circuit 108 with a communications circuit 105 to receive pixel data corresponding to multiple exposures of an image from the sensor 102, as well as a sorting circuit 107. The interface circuit 108 is operatively connected with a memory circuit 110 in the IC 100. In one example, the communications circuit 105 of the pixel data interface 108 is a mobile industry processor interface (MIPI) circuit that supports a camera serial interface (CSI) communications protocol to receive the pixel data from the sensor 102. For example, the communications circuit 105 supports MIPI CSI-2 or CSI-3 communications. The interconnection 103 in one example includes multiple IC pins and corresponding circuit board traces and connections to the sensor 102, to provide an integer number N data line connections between the sensor 102 and the pixel data interface circuit 108, and the interconnection 103 may further include one or more connections for clock signals. The sensor 102 provides multiple sets of pixel data associated with multiple exposures of an image corresponding to the sensor field 106. In particular, the sensor 102 provides first exposure data corresponding to a first exposure of the sensed image at a first exposure time, in this case the longest exposure time of two or more exposures, as well as second exposure data corresponding to a second exposure obtained using a shorter second exposure time. In other examples, the concepts can be extended to multi-exposure image data including more than two sets of exposure data, and each set of exposure data typically corresponds to a unique exposure time. This allows exploitation of a full dynamic range using a single sensor 102.

The IC 100 further includes a processing circuit 112 operatively coupled with the memory circuit 110, and configured according to one or more configuration parameters 140 to process exposure data corresponding to multiple exposures of an image. The processing circuit 112 includes a single pre-processing circuit 120 which operates to perform initial processing or pre-processing operations on the input exposure data. The pre-processing circuit 120 provides image filtering operations which typically work in the linear domain (prior to merge). Thus, these operations are performed on each independent exposure individually. In the illustrated example, the pre-processing circuit 120 includes a noise filtering circuit 121, a deflect pixel correction circuit 122, a DC clamp removal circuit 123, a lens shading correction circuit 124 and white balance correction circuit 125. The noise filtering and defect pixel correction circuits 121 and 122 can be used to enhance the quality of the tone mapping logic 134 performed after merge processing. In addition, the DC clamp removal circuit 123 preferably operates on the data prior to white balance correction in the circuit 125, and also preferably prior to tone mapping, and thus these operations are advantageously performed as part of the pre-processing circuit 120 before merge processing. Furthermore, the lens shading correction circuit 124 is advantageously used to operate on the separate exposure data before merge processing, prior to any non-linear operations.

In other examples, fewer or more pre-processing circuits and functions can be implemented in the pre-processing circuit 120. In the example of FIG. 1, the single pre-processing circuit 120 sequentially performs the illustrated operations using the circuits 121-25 on the first input exposure data (labeled "LONG" in FIG. 1) and the second input exposure data (labeled "SHORT"). This is in contrast to prior WDR sensor circuits that included separate, dedicated pre-processing circuitry for each set of exposure data for a given image.

The processing circuit 112 in FIG. 1 further includes a merge circuit 130 to process first and second pre-processed exposure data to generate merged image data representing the image, and the merged data is provided to a tone mapping circuit 134. Tone mapped data for the image is then post-processed by a post-processing circuit 136, and stored in the memory circuit 110 for access by a host system 142. In this example, the host system 142 can configure the IC 100 by storing one or more configurable or configuration parameters 140 in the IC 100 as explained further below.

Operation of the IC 100 is generally illustrated in the method 200 of FIG. 2. In general, the interface circuit 108 receives the input exposure data from the sensor 102, and provides the data to the memory circuit 110. In the example of FIG. 1, the memory circuit 110 is a dual data rate (DDR) memory circuit, or multiple DDR memory circuits. The memory circuit 110 includes a first portion or location 110a (labeled DDR-1 in FIG. 1), a second portion or location 110b (labeled DDR-2), a third portion or location 110c (DDR-3) and a fourth portion or location 110d (DDR-4). In other examples for processing more than two exposures of a given image, the memory circuit 110 can include further locations or portions (not shown). In operation of the illustrated example, the interface circuit 108 stores first input exposure data LONG that is associated with a first exposure of the image in the first memory portion or location 110a (202 in FIG. 2). At 204 in FIG. 2, the interface circuit 108 stores the second input exposure data SHORT associated with a second exposure of the image in the second memory portion or location 110b.

At 206 in FIG. 2, the single pre-processing circuit 120 performs pre-processing operations on the first exposure data LONG from the first memory portion 110a to generate first pre-processed exposure data (401 in FIG. 4 below) associated with the first exposure of the image, and the circuit 120 in FIG. 1 stores the first pre-processed exposure data in the third memory portion 110c at 208 in FIG. 2. The processing circuit 112 advantageously obtains the second input exposure data SHORT from the second memory portion 110b and reuses the same single pre-processing circuit 120 to perform initial image processing at 210 in FIG. 2 on the second input exposure data SHORT to generate second pre-processed exposure data associated with the second exposure of the image (402 in FIG. 4). The merge circuit 130 in FIG. 1 processes the first and second pre-processed exposure data 401 and 402 at 212 to generate merged image data representing the image (404 in FIG. 4). At 214 in FIG. 2, the processing circuit 112 uses the tone mapping circuit 134 to perform tone mapping processing on the merged image data 404 from the merge circuit 130. In one example, the tone mapping circuit 134 performs global and subsequent local tone mapping operations to reduce the bit depth (e.g., compress) a merged image from 20 bits to lesser (16 or 12 bits), while still preserving the low lights and the high lights of the image. This processing reduces bit depth while preserving image quality.

A post-processing circuit 136 performs further image processing 214 on the merged image data 404 to generate final image data. The post-processing circuit 136 in one example includes image filtering circuitry to operate on merged image data, and the associated post-processing operations are only applied once irrespective of the number of exposures. In particular, the post-processing operations performed by the circuit 136 do not need to be performed in a linear domain since the pixel data after merge and tone map processing is typically non-linear. At 216, the processing circuit 112 stores the final image data in the fourth memory portion 110d. The memory portion 110d then provides the final image data to the host system 142 at 218 in FIG. 2.

As seen in FIG. 1, the IC 100 includes only a single pre-processing circuit 112, and the first input exposure data LONG is preprocessed and temporarily stored in the third memory portion 110c for eventual provision to the merge circuit 130 along a first pre-processing path 131. The second input exposure data SHORT is preprocessed directly through the pre-processing circuit 120 and provided to the merge circuit 130 along a second pre-processing path 132. This solution advantageously employs a multi-pass pre-processing approach prior to merge processing in order to trade off performance in favor of saving IC area and cost. In certain implementations, the IC 100 can be operated at a clock speed such that any desired throughput requirements are met for typical use-cases in consideration of the multi-pass operation for image data pre-processing. The circuit 112 in one example is operable at a clock frequency of 200 MHz for supporting 2Mpix resolutions at 30 fps with considerable margin (2Mpix @ 30 fps is typically the highest requirement for automotive devices). The IC 100 thus capitalizes on the dynamic range advantages of WDR sensors 102 and other multi-exposure image data sources, with the merge circuit 130 and other post-processing circuits 134, 136 performing image processing and other operations to provide the final output image data with full dynamic range. This approach allows capture of a higher dynamic range with efficient image processing circuit space and cost to provide intelligent solutions for applications like security and automotive imaging systems which are expected to generate correctly exposed images even in adverse lighting conditions. Examples of such adverse lighting conditions include surveillance cameras operating in the morning/evening hours when the sun is low in the horizon and facing the camera, automotive cameras when a vehicle is emerging from a dark parking lot or tunnel to a sunlit road, and indoor scenes such as dark room with a sun lit window where both the room interior and the outside scenery should be properly exposed.

Under these extreme lighting conditions, the system of FIG. 1 provides final image data to the host system 142 having reduced or eliminated overexposed or "blow-out" regions while still showing good details in the dimly lit parts of the image.

Figure 3:
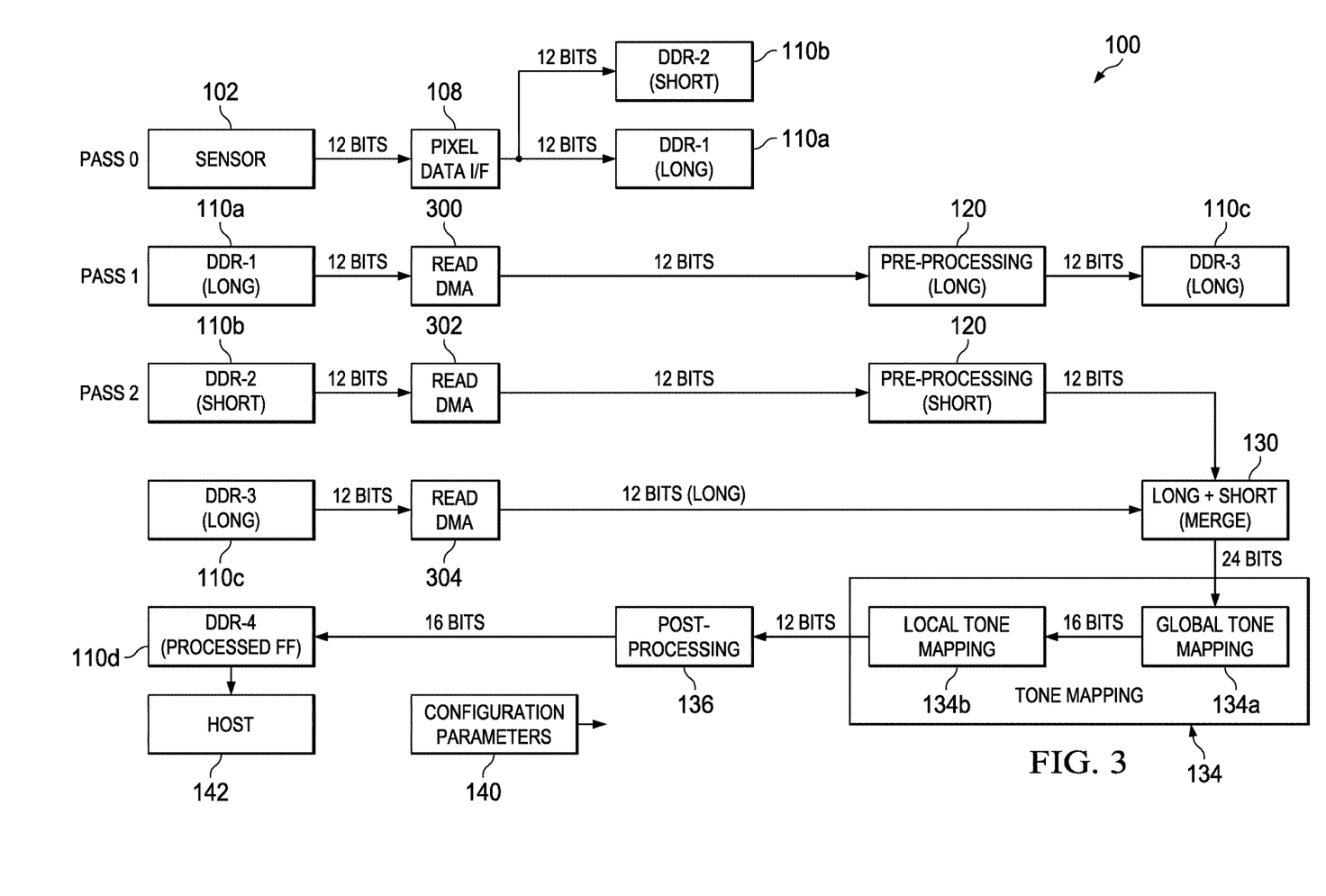
FIG. 3 is a frame data flow diagram.

FIG. 3 illustrates a frame data flow with the multi-pass pre-processing in the IC 100, including PASS 0, PASS 1 and PASS 2 for initial processing prior to merge processing in the merge circuit 130. As shown in FIG. 3, the sensor 102 in one example provides 12 bit input exposure data to the interface 108, which stores the LONG first input exposure data into the first memory location 110a (202 in FIG. 2), and stores the 12 bit second input exposure data SHORT into the second memory location 110b. In PASS 1, the first input exposure data LONG is read by the processing circuit 112 using a "Read DMA" direct memory access 300 of the first memory location 110a, and the data is pre-processed in the circuit 120 to generate first pre-processed exposure data, which is then stored in to the third memory location 110c. In PASS 2, the second input exposure data SHORT is obtained from the second memory location 110b using a Read DMA operation 302, and the second input exposure data is pre-processed in PASS 2 using the same pre-processing circuit 120. The pre-processed exposure data is then merged using the merge circuit 130. The data after merge processing in one example is 24 bits, which is then global tone mapped to 16 bits, followed by local tone map to 12 bits, and the compressed, merged, image data is processed through the rest of the image pipeline for one or more post-processing steps (e.g., circuit 136 in FIG. 1).

Figure 4:
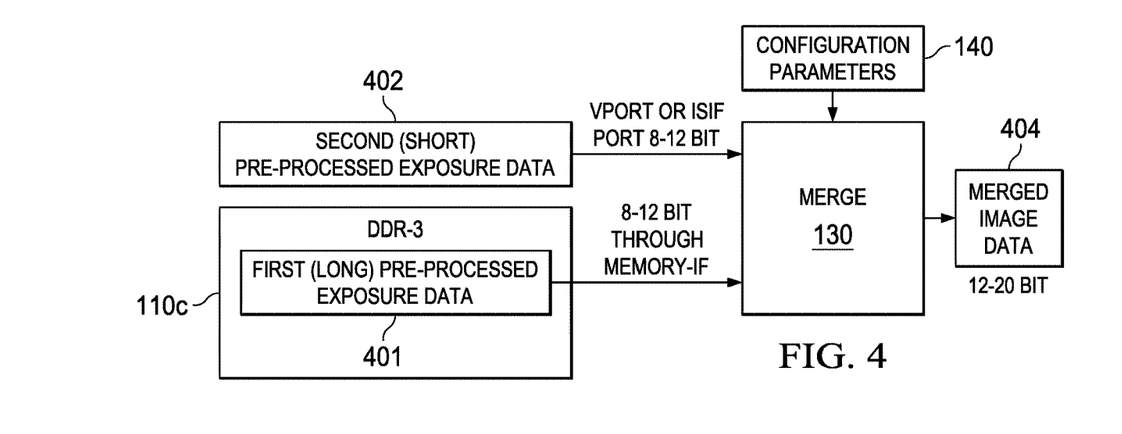
FIG. 4 is a system level diagram of merge processing in the IC of FIG. 1.

Referring now to FIG. 4, conventional exposure merging techniques suffer from artifacts which can arise due to either motion and/or high level of noise in the incoming image data. Disclosed examples employ merge circuitry to implement a sophisticated, noise robust and Motion Adaptive algorithm for the merge process to mitigate or eliminate artifacts and provide better image quality. In certain examples, the merge processing circuit 130 provides intelligent, configurable, merging of multiple sets of exposure data. FIG. 4 shows a system level depiction of the merge processing in the IC of FIG. 1. The first pre-processed exposure data 401 is received by the merge circuit 130 from the third memory location 110c as discussed above. In one example, the first pre-processed exposure data for a one is 8-12 bit pixel data associated with the first exposure of the corresponding image, and the merge circuit 130 obtains the data 401 through a memory interface (IF) operation (e.g., a DMA access in one example). The second pre-processed exposure data 402 (e.g., 8-12 bits) is provided by the pre-processing circuit 120 (FIG. 1) to the merge circuit 130. The merge circuit 130 operates as generally described above, using one or more configuration parameters 140 as detailed further below, to generate and provide the merged image data 404 (e.g., 12-20 bits in certain disclosed examples). The circuit 130 in one example merges the data 401, 402 for the two exposures to generate a high bit width (e.g., up to 24 bits) merged frame. In one example, the tone mapping circuit 134 in FIG. 1 implements a global tone mapping operation to reduce the range from 24 to 16 bits, and a local tone map can be applied to reduce the dynamic range from 16 to 12 bits while still preserving details in the highlights as well as the shadow regions of the image.

Referring now to FIGS. 5-9, the merge circuit 130 in one example provides adaptive configurable control over the merge process. Processing generally suffers from image quality degradation due to a variety of causes. In particular, there are two potential reasons for image quality degradation while merging the pre-processed long and short exposure data. These are degradation due to noise and degradation due to motion. With respect to noise degradation, a merge process is a threshold based operation, and is sensitive to noise in the incoming pre-processed exposure pixel data. For instance, if the merge logic is based on the first pre-processed exposure data 401, noise in that data can cause conventional merge logic to choose an incorrect exposure, and frequent switching across exposures due to noise will result in significant artifacts in the final merged image data.

With respect to motion degradation, most WDR sensors 102 involve a temporal lag between the long and short exposures, since a single sensor is being used to initially produce one set of exposure data, and then a second set of exposure data at a different exposure time setting. For example, the long exposure time setting is usually large (e.g., 33 ms or more), and there can be significant motion delay in image to objects, or in the reference frame of the camera sensor 102 (e.g., in vehicle mounted camera applications) before the short exposure is captured. In particular, fast moving objects in the frame could have moved in the frame, resulting in motion blur. This problem is specifically present in automotive use cases where the automobile (and the camera) are traveling at a fast speeds and even stationary objects are moving relatively with respect to the car.

A third issue is flickering light sources, such as the presence of LED lights or other flickering light sources in the captured scene. LED lights are typically operated in an on/off fashion with an on-off period and duty cycle (i.e., they are not always emitting light, rather they switch on and off in a periodic fashion). The duty cycle of this period is used to regulate the intensity of the image. Although the flickering effect of most LED light sources is not perceptible to the human eye, in digital images it is possible that subsequent frames may alternatively capture and miss the LED active duty cycle, leading to a phenomenon known as LED Flicker. The LED flicker problem is further exacerbated when using WDR sensors, where one exposure might capture the LED in on state (e.g., the long exposure), whereas the other exposure (e.g., the short exposure time setting exposure data for the same frame) may miss the LED. When these two separate exposures are merged, the resulting output may exhibit artifacts.

Figure 5:
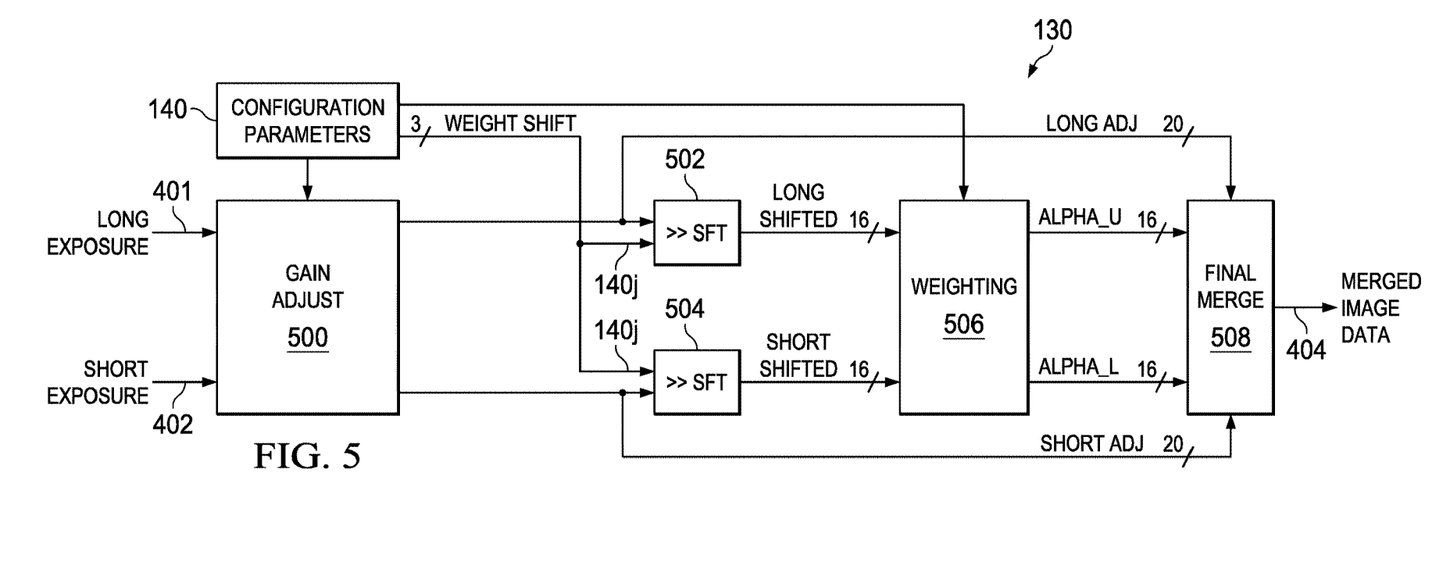
FIG. 5 is a system level diagram showing further details of the merge circuit in FIGS. 1 and 4.

The example merge circuits 130 in FIGS. 1, 5, 6 and 9 can be used to address the above issues. In particular, the circuit 130 provides an intelligent merge approach which is resilient to noise as well as motion artifacts and LED flicker. The merge processing generally involves combining two or more exposures to generate a wide dynamic range scene. In one example, two (e.g., long exposure time setting, and short exposure time setting) 12 bit exposures are combined to generate a single 20 bit (or 16 bit) frame, resulting in a unified or merged exposure which is higher in bit depth than either of the two original sets of exposure data for a given image. As best seen in FIG. 5, the merge circuit 130 includes a gain circuit 500 (labeled "GAIN ADJUST" in FIG. 5), along with first and second shift circuits 502 and 504, a weighting circuit 506 and a final merge circuit 508. In operation, the gain circuit 500 applies a gain to one or both of the first and second pre-processed exposure data 401 and/or 402 to generate first gain-adjusted exposure data LONG ADJ associated with the first exposure of the image, and second gain-adjusted exposure data SHORT ADJ associated with the second exposure of the image. In the illustrated example, the gain-adjusted data LONG ADJ and SHORT ADJ are 20 bits long, although other bit depths are possible. The gain circuit 500 operates according to one or more configuration parameters 140 in certain examples. An example gain circuit 500 is described further below in connection with FIG. 6.

The shift circuits 502 and 504 shift the first and second gain-adjusted exposure data LONG ADJ and SHORT ADJ according to a 3 bit WEIGHT SHIFT configuration parameter 140$j$ to generate 16 bit first and second shifted exposure data LONG SHIFTED and SHORT SHIFTED, and these are provided as input data to the weighting circuit 506. The weighting circuit 506 computes a 16 bit first weight value ALPHA_L for merge processing 212 of the first shifted exposure data LONG SHIFTED, and a second weight value ALPHA_U for merge processing 212 of the second shifted exposure data LONG SHIFTED. The weighting circuit 506 in certain examples operates according to one or more configuration parameters 140. A detailed example weighting circuit 506 is illustrated and described below in connection with FIGS. 7-9. The final merge circuit 508 receives the first and second weight values ALPHA_L and ALPHA_U and merges the first and second gain-adjusted data LONG ADJ and SHORT ADJ to generate the merged image data 404 according to the first and second weight values ALPHA_L, ALPHA_U.

Figure 6:
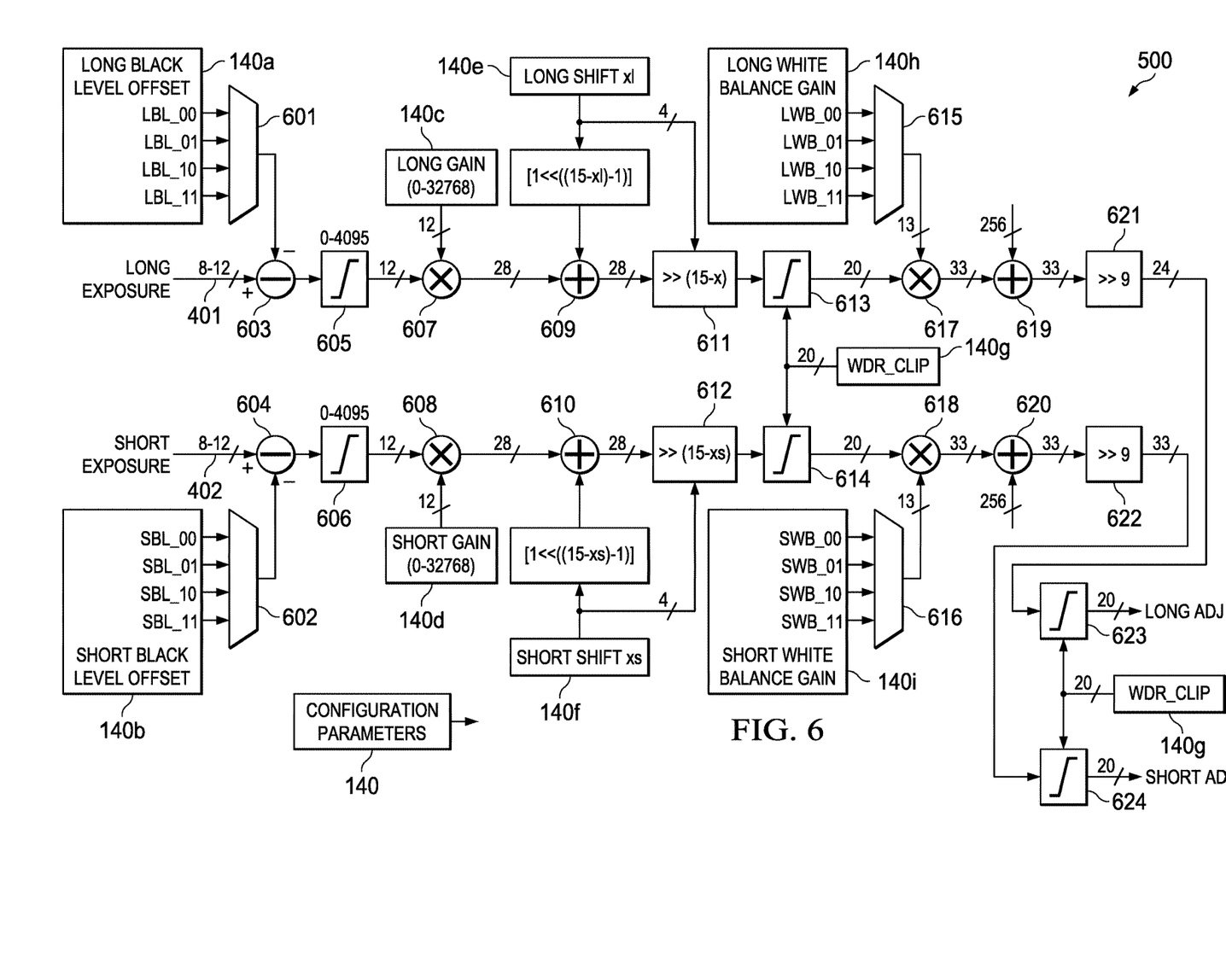
FIG. 6 is a detailed schematic diagram of a gain adjustment circuit in the merge circuit of FIG. 5.

FIG. 6 shows further details of one example of the gain circuit 500. The gain circuit 500 applies a gain to one or both of the first and second exposure data 401 and 402 to move the values closer to one another, ideally to bring them to the same intensity scale. In one example, a unity gain is applied on the first exposure data 401 and a higher gain is applied on the short exposure data 402. In order to account for fixed point arithmetic in certain implementations, and to reduce error in the gain application, the gain circuit 500 in one example applies a gain of '1' on the short and a gain of <'1' on the long exposure. The first exposure gain "gain_long" in one example is set according to the following equation (1):

$$\text{gain\_long} = 2^{15} \times (\text{shortexposuregain}) / (\text{Longexposuregain}) \quad (1)$$

The gain circuit 500 includes black level offset circuitry 601-604, including circuit 601 and 602 to provide configurable first and second black level offset value parameters 140$a$ and 140$b$ (e.g., four bit values in the illustrated example) to subtractor circuits 603 and 604, respectively. The digital image data in certain examples has a non-zero black level, and as a result, a pixel which should represent zero in the image is a non-zero value, such as 200 in one example. Thus the lowest value in the image is 200, and this value set by the configurable parameters 140$a$ and 140$b$ is subtracted from the image prior to further processing. The values from the black level offset circuit 601 and 602 are respectively subtracted from the first and second exposure data 401 and 402 (e.g., 8-12 bits in one example), and the results are clipped between 0 and 4095 by clipping circuits 605 and 606, respectively. The circuit 605 and 606 provide 12 bit resulting values to multiplier circuits 607 and 608, which multiply the clipped result values by configurable long and short gain values 140$c$ and 140$d$. In this manner, the circuit 607 applies the configurable first gain value 140$c$ to the first exposure data 401 and the circuit 608 applies the configurable gain value 140$d$ to the second exposure data 402 to generate in generating the first and second gain-adjusted exposure data LONG ADJ and SHORT ADJ. As a result of the multiplication by the circuit 607 and 608, 28 bit results are provided to summation or at her circuits 609 and 610, respectively. The gain circuit 500 uses configurable 4 bit first and second (e.g., long and short) shift values 140$b$ and 140$f$ ("xl" and "xs"), which are used to compute shifted values that are summed with the 28 bit values from the multipliers 607 and 608, respectively.

The summation circuits 609 and 610 provide 28 bit results to shift circuits 611 and 612, respectively. The circuits 611 and 612 right shift the 28 bit input values by 15−xl and 15−xs, and the resulting values (e.g., 20 bits in one example) are limited or clipped by clipping circuits 613 and 614 according to a 20 bit configurable clip value 140g (WDR_CLIP). The circuits 613 and 614 provide 20 bit results to multipliers 617 and 618 for long and short white balance gain application according to configurable 13 bit white balance gains 140h and 140i provided by circuits 615 and 616, respectively. Using the circuits 615-618, the gain circuit 500 corrects white balance in the exposure data as part of the processing to generate the first and second gain-adjusted exposure data LONG ADJ, SHORT ADJ. White balance correction operates to remove the color cast from an image. In one example, a unity gain is applied to the green channel values, whereas a non-unity gain, above or below 1) is applied to the red and blue channels. After white balance gain adjustment, 33 bit multiplier result values are provided by the multipliers 617 and 618 to summation circuits 619 and 620, which add a value of 256 to provide 33 bit outputs in the illustrated example. These outputs are shifted right by nine bits using shift circuits 621 and 622. The circuits 621 and 622 provide 24 bit shifted values to clipping circuits 623 and 624. The clipping circuits 623 and 624 operate according to the configurable clip value 140g to provide the 20 bit first and second gain-adjusted exposure data LONG ADJ, SHORT ADJ.

Figure 7:
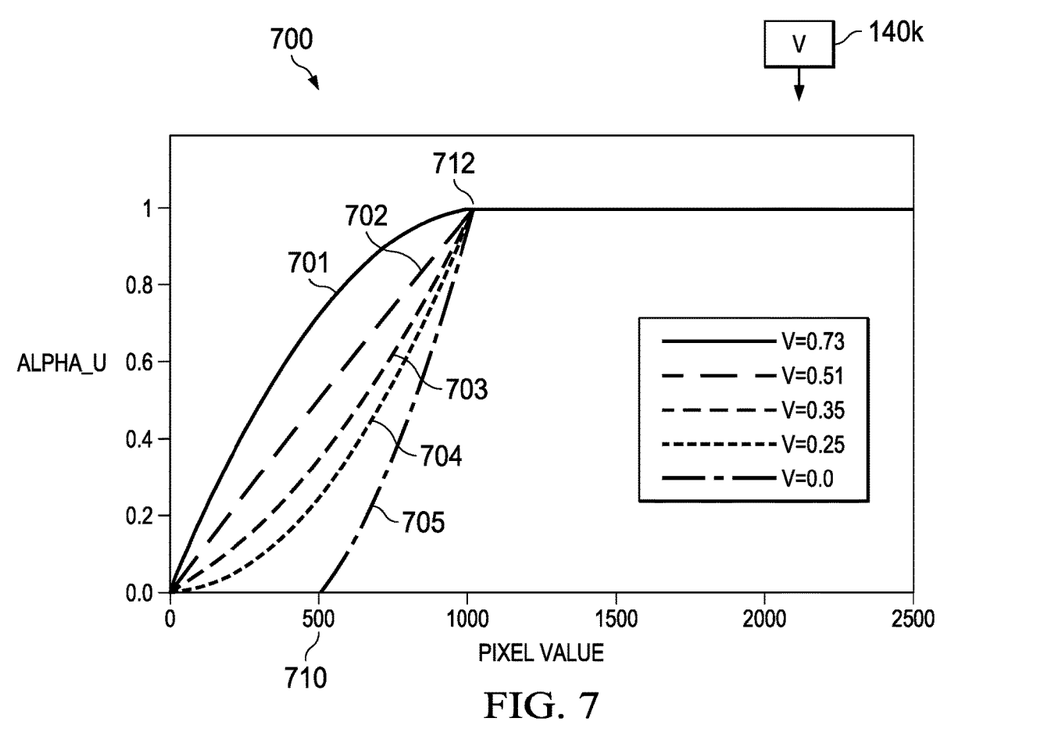
FIG. 7 is a graph of weighting values as a function of incoming pixel value and different values of a configurable parameter (V).
Figure 8:
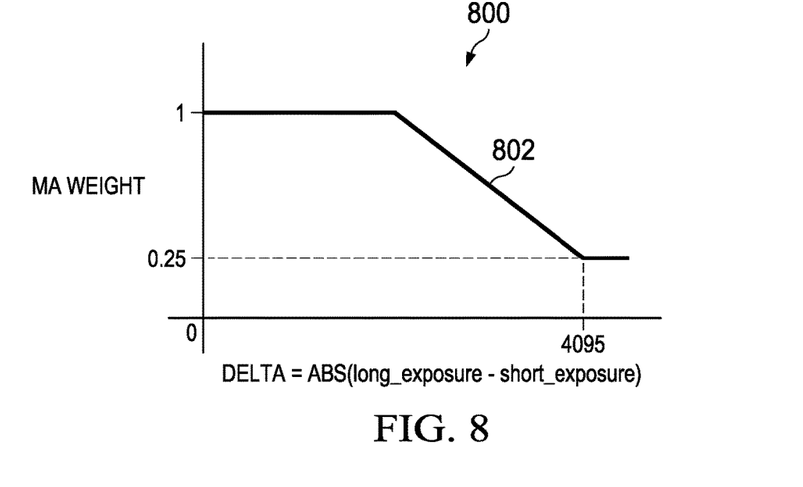
FIG. 8 is a graph of a motion adaptive weighting value as a function of the difference between long and short pixel values.
Figure 9:
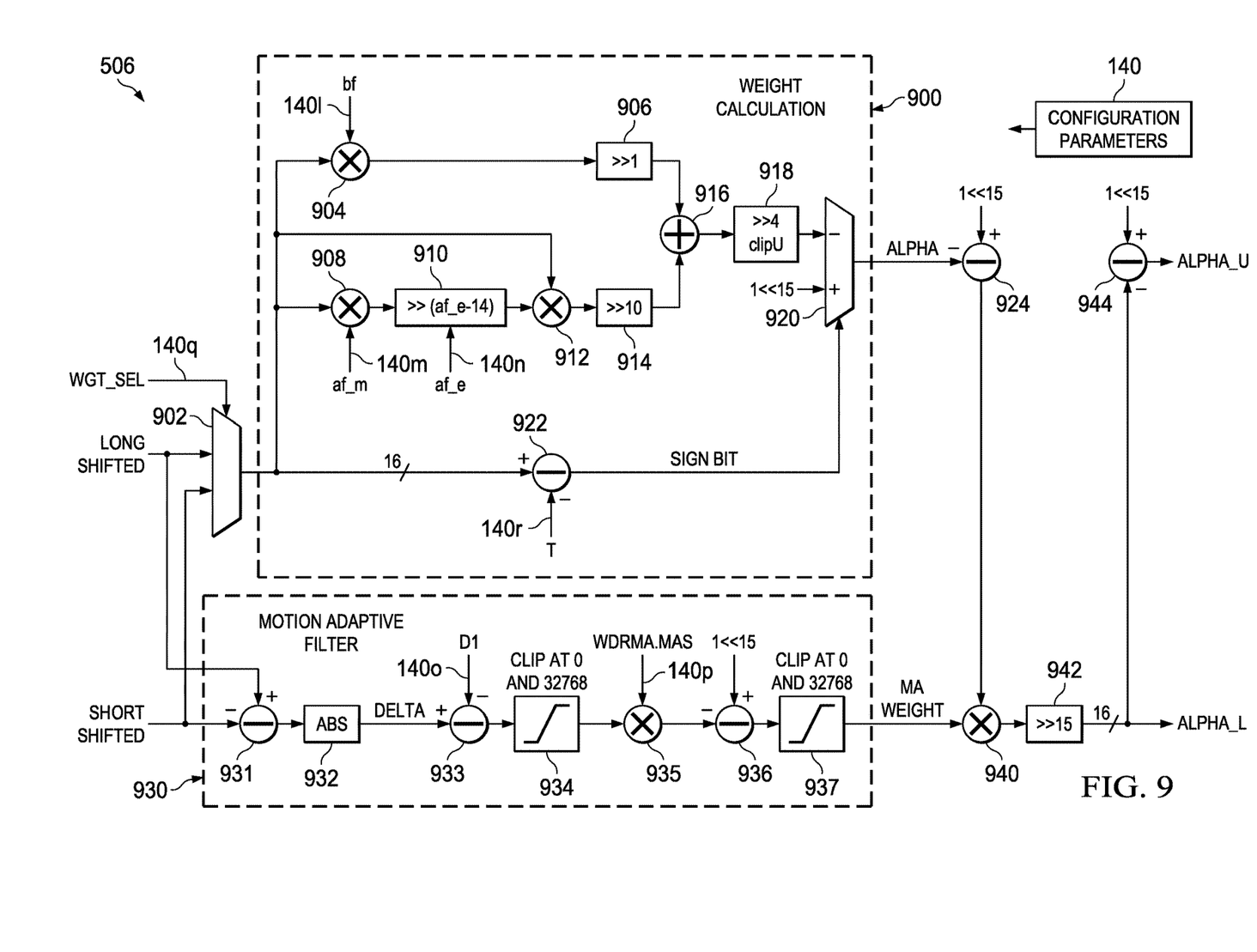
FIG. 9 is a detailed circuit diagram of a weighting circuit in the merge circuit of FIG. 5.

Illustrate further details of an example weighting circuit 506. A graph 700 in FIG. 7 shows curves 701, 702, 703, 704 and 705 illustrating weighting values as a function of incoming pixel value, and the graph 800 in FIG. 8 shows a motion adaptive weighting value curve 802 (MA Weight) as a function of the difference Delta between long and short pixel values. FIG. 9 shows further details of one example of the weighting circuit 506. The circuit 506 in this example includes a weight calculation circuit 900 and a motion adaptive filter circuit 930. The weight calculation circuit 900 computes an initial weight value alpha based on either the first or the second shifted exposure data according to a configurable selection parameter 140q (WGT_SEL), used for LED flicker reduction. The circuit 900 also uses a configurable first threshold value 140r (T) in computing alpha. When the value of the selected first or second shifted exposure data LONG SHIFTED or SHORT SHIFTED for the current pixel location in the image is greater than T, the circuit 900 computes alpha as a first predetermined value (e.g., 32,768). Otherwise, if the selected value is less than or equal to T, the circuit 900 computes the initial weight value alpha according to one or more configurable parameters 140l, 140m, 140n (bf, af_m and af_e in FIG. 9) and according to the selected long or short data pixel value for the current pixel location. These parameters 140l, 140m and 140e in one example collectively constitute a configurable parameter "V" (140k) shown in FIG. 7. In particular, the configurable parameter or parameters are used by the weight calculation circuit 900 to set the shape of the curve 701, 702, 703, 704 or 705 below the threshold value 712 in the graph 700. As seen in this graph, the weighting circuit 506 sets the short (second) weight value ALPHA_U to be a constant value (e.g., scaled value "1" in the graph 700) for pixel values above the threshold 712. Below this value (e.g., 1000 in the illustrated example), the configuration parameter or parameters 140k, 140l, 140m and/or 140n can be configured by the host system 142 (FIG. 1) to implement any suitable curve for blending between the first and second exposure data sets below the threshold 712. The curve 701-705 in FIG. 7 are non-limiting examples for V=0.73, V=0.51, V=0.35, V=0.25 and V=0, where the curve 705 (V=0) terminates with a value ALPHA_U=0 at a pixel value 500 in this example (indicated in FIG. 7 at threshold value 710). In this manner, the IC 100 can be configured to implement any desired blending or merging of the first and second exposure data 401 and 402.

The weighting circuit 506 includes a multiplexer or selection circuit 902 operative according to the select signal (configuration parameter 140q) to provide one of the long or short shifted data streams to the weight calculation circuit 900, in this example a 16 bit value. Multiplier circuits 904 and 908 in the circuit 900 scale the selected value by first and second configuration parameter values 140l (bf) and 140m (af_m), respectively. The output of the multiplier 904 is shifted right one bit by a shift circuit 906, and the output of the circuit 906 is provided as an input to a summation or adder circuit 916. The output of the multiplier 908 is shifted by a shifting circuit 910 according to the configuration parameter 140n (af_e). A multiplier circuit 912 multiplies the shifted result by the selected value, and a shift circuit 914 right shifts the multiplied result by 10 bits in this example. The shifted output from the circuit 914 is added with the output of the shift circuit 906. A shift circuit 918 shifts the summation result right by 4 times a configuration parameter clipU, and the resulting value is provided as a first input to a multiplexer 920. The second input to the multiplexer 920 is a predetermined value, in this example 1 left shifted by 15 bits. The circuit 900 also computes alpha according to the threshold parameter T (140r) using a subtraction circuit 922 which subtracts the threshold value T from the 16 bit selected value from the circuit 902. The subtraction result is used as a "SIGN BIT" operating as a select input to the multiplexer 920. The output of the multiplexer is the initial weight value alpha. A subtraction circuit 924 subtracts a predetermined value (e.g., 1 left shifted by 15 bits) to provide an input to a multiplier 940 for selective scaling according to a motion adaptive weight value MA Weight from the motion adaptive filter circuit 930.

The weighting circuit 506 also adapts for motion in the image data. The motion adaptive filter circuit 930 computes a difference value delta (shown as the horizontal axis "Delta" in FIG. 8). This value is computed as an absolute value of the difference between values of the first and second shifted exposure data LONG SHIFTED and SHORT SHIFTED for the current pixel location in the image, using a subtraction circuit 931 and an absolute value circuit 932 in FIG. 9. The motion adaptive filter circuit 930 further includes a subtraction circuit 933 that subtracts a second threshold value 140o (D1) from the difference value delta. A clipping circuit 934 clips the resulting value between 0 and the first predetermined value 32,768, and the result is multiplied by a configuration parameter 140p (WDRMA.MAS) using a multiplier circuit 935. A subtraction circuit 936 subtracts the multiplied value from a predetermined value (e.g., 1 left shifted by 15 bits), and the subtraction result is clipped between 0 and 32,768 by a clipping circuit 937. The circuit 932nd provides the clipped output as the motion adaptive weight value MA Weight.

The multiplier circuit 940 multiplies the motion adaptive weight value MA Weight by the output of the subtraction circuit 924, and the result is right shifted by 15 bits in one example using a shift circuit 942. The shift circuit 942 provides the 16-bit first weight value ALPHA_L, and a subtraction circuit 944 provides the first weight value ALPHA_U as 1−ALPHA_L. As seen in FIG. 9, when the difference value delta is greater than or equal to the second threshold value 140o (D1), the motion adaptive filter circuit 930 computes the motion adaptive weight value MA Weight according to the difference value delta, and otherwise the motion adaptive weight value is set to a constant value (1 in this example). Using the circuitry 940, 942 and 944, the weighting circuit 506 multiplies the initial weight value alpha by the motion adaptive weight value MA Weight to generate the first weight value ALPHA_L, and computes the second weight value ALPHA_U by subtracting the first weight value ALPHA_L from the first predetermined value (e.g., 32,768).

In this example, the circuit 506 generates the weights for the long and the short exposure. The weights ALPHA_L and a ALPHA_U are used for interpolation in the final merge circuit 508 (FIG. 5) to create the merged output, where FIG. 8 shows the effects of the motion adaptive filtering provided by the circuit 930. As seen in the graph 800, the motion adaptive modification of the value alpha occurs at higher values of Delta, and the illustrated circuit 930 implements a minimal value for the motion adaptive weight at 0.25, although other implementations are possible to provide a different minimal value. The weight calculation circuit 900 in FIG. 9 helps combat pixel noise, and the motion adaptive filter circuit 930 helps suppress motion artifacts. The weight calculation circuit example 900 in FIG. 9 calculates the value of alpha using the following equation (2):

$$\text{alpha} = \begin{cases} 1 & x > T \\ clipU(\text{af\_m} \times x \times x \times 2^{-af\_e} + bf \times x \times 2^{-5}) & x < T \end{cases} \quad (2)$$

In equation (2), 'x' is the value of the incoming pixel data, whereas T, af_m, bf and af_e are configurable parameters 140. Without the motion adaptive circuit 930, 'alpha' would act as the gain for the short pixel and the gain for the long pixel is set as '1-alpha'. As seen in FIG. 7, the weight graph 700 can be manipulating by changing the different configuration parameters to implement different performance curves. In this graph 700 the threshold 712 (T) is set to 1000 and the graphs 701, 702, 703, 704 and 705 respectively represent the weight for the short pixel weighting (y axis) as a function of the pixel value (x axis) for example values 0.73, 0.51, 0.35, 0.25 and 0.0. V is a simplified configuration parameter 140k derived from the configuration parameters af_m, af_e and bf. The examples in the graph 700 show that the weight for the short pixel is '1' once the pixel value is greater than 1000, whereas it follows a non-linear curve from 0-1000. This provides flexibility in setting any suitable desired dynamic range by selecting a correct mix between the long and the short exposure. Each curve 701-705 may be suitable for a different kind of sensor 102 (FIG. 1). In one example for a y-axis value of 0.4, the output would be calculated with a weight of 0.4 for the short exposure, and 0.6 for the long exposure (e.g., out=0.4*short+0.6*long). The motion adaptive filter circuit 930 in FIG. 9 is described using the following equations (3a-3d), in which 32768 represents a value of 1.0 (Pseudo float notation).

$$\text{delta} = abs((\text{long } exposurepixel) - (\text{short } exposurepixel)) \quad (3a)$$

$$\text{MAweight} = \begin{cases} 32768 & \text{delta} < D1 \\ clupU(32768 - (\text{delta} - D1) * \text{slope}) & D1 \le \text{delta} \end{cases} \quad (3b)$$

$$\text{ALPHA\_L} = (32768 - \text{alpha}) * MAWeight \gg 15 \quad (3c)$$

$$\text{ALPHA\_U} = (32768 - \text{Alpha\_L}) \quad (3d)$$

ALPHA_U is the final weight for short exposure value, and ALPHA_L is for long exposure value. The curve 802 in FIG. 8 shows the motion adaptive weight calculation implemented by the circuit 930 in FIG. 9. In operation when the difference between the long and the short pixel is less (delta is small), the circuit 930 sets the MA_Weight to 1 and effectively the motion adaptive filter circuit 930 does not modify alpha. However, when the delta is large, the MA_Weight takes is a lesser than 1 value. For example at the extreme, when delta=4095, the MA_weight has a value of 0.25. In this case, the long exposure weight is decreased, since it is multiplied by a factor of 0.25. The short exposure weight then correspondingly increases since it is computed as 1.0-long exposure weight. As a result, whenever there is motion in the image, the weight is skewed towards the short exposure.

Similar logic circuitry can be used to account for LED flicker. Whenever an LED light source (or other pulsed source of light) is in the image and there is flicker, the long exposure has a much higher probability of capturing the LED source than does the short exposure. To completely avoid flicker artifacts, the long exposure time can be kept higher than the frequency of the LED source. For example an exposure time of 11 ms or higher will always capture the LED source correctly if the LED source frequency is 90 Hz (e.g., many LED sources are operated at a frequency of approximately 90 Hz). If LED flicker suspected in a given application, the motion adaptive circuit 930 can be reconfigured by setting appropriate configuration parameters 140 in order 800 to apply a decreasing weight towards the short exposure. In this example, the graph in FIG. 8 remains as shown, but MA_Weight is applied to the short exposure instead of the long exposure. In this case, whenever there is a significant delta between the long and short exposure values, it is assumed there is LED flicker and a higher weighting is given to the long exposure in the merge process. Since the long exposure is considered to be flicker free, the weighting mechanism generates a merge frame which is free from flicker.

Once the weights are calculated, the final merge block 508 (FIG. 5) blends the two exposures using the following equation (4):

$$\text{out}=(\text{LongExposurePixel} \times \text{Alpha\_L}+\text{Short ExposurePixel} \times \text{Alpha\_U}+(1 \ll (s-1))) \gg (s) \quad (4)$$

where "s" is the fractional precision (or number of fractional bits) in fixed point notation.

The disclosed examples address the separate exposure WDR data flows supported by many sensors, and provides for processing multi-exposure WDR input data without incurring the cost penalty associated with duplication the image pre-processing circuitry. This provides an trade-off for balance between performance and saving area using an intelligent two pass approach. Significant cost (logic as well as memory area) savings are thus facilitated, making the signal processing IC 100 suitable for cost sensitive applications. In addition, the IC 100 implements advanced circuitry and techniques for merging multiple exposures, which is robust towards both image-noise as well as motion artifacts.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A circuit comprising:
a gain circuit configured to:
receive first exposure data associated with a first exposure of an image;
receive second exposure data associated with a second exposure of the image; and
apply a gain to at least one of the first exposure data and the second exposure data to generate a first gain-adjusted exposure data associated with the first exposure of the image and a second gain-adjusted exposure data associated with the second exposure of the image;
a shift circuit configured to:
shift the first gain-adjusted exposure data and the second gain-adjusted exposure data to generate a first shifted exposure data associated with the first exposure of the image and a second shifted exposure data associated with the second exposure of the image;
a weighting circuit configured to:
compute a first weight value for merge processing of the first shifted exposure data; and
compute a second weight value for merge processing of the second shifted exposure data; and
a final merge circuit configured to:
merge the first gain-adjusted exposure data and the second gain-adjusted exposure data to generate a merged image data based on the first weight value and the second weight value.

2. The circuit of claim 1, wherein:
the gain circuit generates the first gain-adjusted exposure data and the second gain-adjusted exposure data in response to a first circuit applying a configurable first white balance gain to the first exposure data and a second circuit applying a configurable second white balance gain to the second exposure data.

3. The circuit of claim 1, wherein:
the gain circuit generates the first gain-adjusted exposure data and the second gain-adjusted exposure data in response to a first circuit applying a configurable first black level offset to the first exposure data and a second circuit applying a configurable second black level offset to the second exposure data.

4. The circuit of claim 1, wherein:
the gain circuit generates the first gain-adjusted exposure data and the second gain-adjusted exposure data in response to a first circuit applying a configurable first gain value to the first exposure data and a second circuit applying a configurable gain value to the second exposure data.

5. The circuit of claim 1, wherein:
the weighting circuit includes:
a weight calculation circuit to determine an initial weight value based on a selected one of the first shifted exposure data, the second shifted exposure data, and a configurable first threshold value, the weight calculation circuit configured to:
in response to a value of the selected one of the first shifted exposure data and the second shifted exposure data for a current pixel location in the image being greater than the configurable first threshold value, determine the initial weight value as a first predetermined value, and
in response to the value of the selected one of the first shifted exposure data and the second shifted exposure data for the current pixel location being less than or equal to the configurable first threshold value, determine the initial weight value according to one or more configurable parameters and the value of the selected one of the first shifted exposure data and the second shifted exposure data for the current pixel location; and
a motion adaptive filter circuit to determine a difference value as an absolute value of a difference between values of the first shifted exposure data and the second shifted exposure data for the current pixel location in the image, the motion adaptive filter circuit configured to:
in response to the difference value being less than a configurable second threshold value, determine a motion adaptive weight value as the first predetermined value, and
in response to the difference value being greater than or equal to the configurable second threshold value, determine the motion adaptive weight value according to the difference value;
wherein the weighting circuit is configured to multiply the initial weight value by the motion adaptive weight value to generate the first weight value, and to determine the second weight value by subtracting the first weight value from the first predetermined value.

6. The circuit of claim 5, wherein:
the gain circuit generates the first gain-adjusted exposure data and the second gain-adjusted exposure data in response to a first circuit applying a configurable first white balance gain to the first exposure data and a second circuit applying a configurable second white balance gain to the second exposure data.

7. The circuit of claim 5, wherein:
the gain circuit generates the first gain-adjusted exposure data and the second gain-adjusted exposure data in response to a first circuit applying a configurable first black level offset to the first exposure data and a second circuit applying a configurable second black level offset to the second exposure data.

8. The circuit of claim 5, wherein:
the gain circuit generates the first gain-adjusted exposure data and the second gain-adjusted exposure data in response to a first circuit applying a configurable first gain value to the first exposure data and a second circuit applying a configurable gain value to the second exposure data.

9. A method comprising:
receiving, by a gain circuit, a first exposure data associated with a first exposure of an image;
receiving, by the gain circuit, a second exposure data associated with a second exposure of the image;
applying, by the gain circuit, a gain to at least one of the first exposure data and the second exposure data to generate a first gain-adjusted exposure data associated with the first exposure of the image and a second gain-adjusted exposure data associated with the second exposure of the image;
shifting, by a shift circuit, the first gain-adjusted exposure data and the second gain-adjusted exposure data to generate a first shifted exposure data associated with the first exposure of the image and a second shifted exposure data associated with the second exposure of the image;
determining, by a weighting circuit, a first weight value for merge processing of the first shifted exposure data;
determining, by the weighting circuit, a second weight value for merge processing of the second shifted exposure data; and merging, by a final merge circuit, the first gain-adjusted exposure data and the second gain-adjusted exposure data to generate a merged image data based on the first weight value and the second weight value.

10. The method of claim 9, wherein:
the gain circuit generates the first gain-adjusted exposure data and the second gain-adjusted exposure data in response to a first circuit applying a configurable first white balance gain to the first exposure data and a second circuit applying a configurable second white balance gain to the second exposure data.

11. The method of claim 9, wherein:
the gain circuit generates the first gain-adjusted exposure data and the second gain-adjusted exposure data in response to a first circuit applying a configurable first black level offset to the first exposure data and a second circuit applying a configurable second black level offset to the second exposure data.

12. The method of claim 9, wherein:
the gain circuit generates the first gain-adjusted exposure data and the second gain-adjusted exposure data in response to a first circuit applying a configurable first gain value to the first exposure data and a second circuit applying a configurable gain value to the second exposure data.

13. The method of claim 9, further comprising:
determining, by the weighting circuit, an initial weight value based on a selected one of the first shifted exposure data, the second shifted exposure data, and a configurable first threshold value; in response to a value of the selected one of the first shifted exposure data and the second shifted exposure data for a current pixel location in the image being greater than the configurable first threshold value, determining, by the weighting circuit, the initial weight value as a first predetermined value; in response to the value of the selected one of the first shifted exposure data and the second shifted exposure data for the current pixel location being less than or equal to the configurable first threshold value, determining, by the weighting circuit, the initial weight value according to one or more configurable parameters and the value of the selected one of the first shifted exposure data and the second shifted exposure data for the current pixel location; determining, by a motion adaptive filter circuit, a difference value as an absolute value of a difference between values of the first shifted exposure data and the second shifted exposure data for the current pixel location in the image; in response to the difference value being less than a configurable second threshold value, determining, by the motion adaptive filter circuit, a motion adaptive weight value as the first predetermined value; in response to the difference value being greater than or equal to the configurable second threshold value, determining, by the motion adaptive filter circuit, the motion adaptive weight value according to the difference value.

14. The method of claim 13, wherein:
the weighting circuit is configured to multiply the initial weight value by the motion adaptive weight value to generate the first weight value, and to determine the second weight value by subtracting the first weight value from the first predetermined value.

15. The method of claim 13, wherein:
the gain circuit generates the first gain-adjusted exposure data and the second gain-adjusted exposure data in response to a first circuit applying a configurable first white balance gain to the first exposure data and a second circuit applying a configurable second white balance gain to the second exposure data.

16. The method of claim 13, wherein:
the gain circuit generates the first gain-adjusted exposure data and the second gain-adjusted exposure data in response to a first circuit applying a configurable first black level offset to the first exposure data and a second circuit applying a configurable second black level offset to the second exposure data.

17. The method of claim 13, wherein:
the gain circuit generates the first gain-adjusted exposure data and the second gain-adjusted exposure data in response to a first circuit applying a configurable first gain value to the first exposure data and a second circuit applying a configurable gain value to the second exposure data.

* * * * *